US008009605B1

(12) United States Patent  
Snodgrass

(10) Patent No.: US 8,009,605 B1  
(45) Date of Patent: Aug. 30, 2011

(54) LOW POWER, PROGRAMMABLE MODEM FOR SOFTWARE DEFINED RADIO APPLICATIONS

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1787 days.

(21) Appl. No.: 11/199,545

(22) Filed: Aug. 8, 2005

(51) Int. Cl.
H04B 7/185 (2006.01)

(52) U.S. Cl. .......................... 370/318; 370/287; 370/311

(58) Field of Classification Search .................. 370/467, 370/325, 387, 311, 318
See application file for complete search history.

(56) References Cited

U.S. PATENT DOCUMENTS

| | | | | | |
|---|---|---|---|---|---|
| 4,996,706 | A | * | 2/1991 | Cho | 379/102.04 |
| 5,134,648 | A | * | 7/1992 | Hochfield et al. | 379/93.29 |
| 5,491,721 | A | * | 2/1996 | Cornelius et al. | 375/222 |
| 5,663,734 | A | * | 9/1997 | Krasner | 342/357.25 |
| 5,719,868 | A | | 2/1998 | Young | 370/436 |
| 5,872,810 | A | * | 2/1999 | Philips et al. | 375/222 |
| 5,930,704 | A | * | 7/1999 | Kay | 455/419 |
| 5,940,438 | A | * | 8/1999 | Poon et al. | 375/222 |
| 5,995,540 | A | * | 11/1999 | Draganic | 375/222 |
| 6,052,600 | A | * | 4/2000 | Fette et al. | 455/509 |
| 6,075,814 | A | * | 6/2000 | Yamano et al. | 375/222 |
| 6,192,070 | B1 | * | 2/2001 | Poon et al. | 375/222 |
| 6,331,973 | B1 | | 12/2001 | Young et al. | 370/337 |
| 6,442,374 | B1 | * | 8/2002 | Brady et al. | 455/73 |
| 6,483,814 | B1 | * | 11/2002 | Hsu et al. | 370/277 |
| 6,574,117 | B1 | | 6/2003 | Lebo | 361/801 |
| 6,577,641 | B1 | | 6/2003 | Izumi | 370/442 |
| 6,580,730 | B1 | | 6/2003 | Loukianov | 370/522 |
| 6,600,754 | B1 | | 7/2003 | Young et al. | 370/459 |
| 6,625,135 | B1 | * | 9/2003 | Johnson et al. | 370/332 |
| 6,631,124 | B1 | | 10/2003 | Koorapaty et al. | 370/337 |
| 6,665,189 | B1 | | 12/2003 | Lebo | 361/730 |
| 6,721,581 | B1 | * | 4/2004 | Subramanian | 455/575.1 |
| 6,741,466 | B1 | | 5/2004 | Lebo | 361/687 |
| 6,747,866 | B1 | | 6/2004 | Lebo et al. | 361/679 |
| 6,748,206 | B1 | * | 6/2004 | Matsumoto | 455/334 |
| 6,785,556 | B2 | * | 8/2004 | Souissi | 455/557 |
| 6,791,994 | B1 | | 9/2004 | Young et al. | 370/436 |
| 6,801,513 | B1 | | 10/2004 | Gibbons et al. | 370/337 |
| 6,810,022 | B1 | | 10/2004 | Young | 370/280 |
| 6,816,562 | B2 | | 11/2004 | Atkinson et al. | 376/39 |

(Continued)

FOREIGN PATENT DOCUMENTS

EP 1059785 A2 * 12/2000

OTHER PUBLICATIONS

Mathstar™, Silicon Objects Software Development Environment, Oct. 2003, 1-6. Mathstar™, Field Programmable Object Arrays, Aug. 2004, 1-20.

(Continued)

Primary Examiner — Ricky Ngo  
Assistant Examiner — Dewanda Samuel  
(74) Attorney, Agent, or Firm — Daniel M. Barbieri

(57) ABSTRACT

A device reconfigurable to support communication using different communication technologies is provided. The device includes, but is not limited to, a plurality of communication processing modules and a switching interface. The switching interface couples to the plurality of communication processing modules. An instruction set is written into the device to select one or more communication processing module of the plurality of communication processing modules to connect using the switching interface. One or more of the communication processing modules may be programmable. The instruction set may include programmable parameters and/or programming instructions for the one or more programmable communication processing modules. As a result, the device is reprogrammable and reconfigurable to process different communication signals while utilizing less power than conventional designs.

22 Claims, 3 Drawing Sheets

U.S. PATENT DOCUMENTS

| | | | | |
|---|---|---|---|---|
| 7,016,668 | B2 * | 3/2006 | Vaidyanathan et al. | 455/418 |
| 7,143,407 | B2 * | 11/2006 | Rajaram et al. | 717/173 |
| 7,180,934 | B2 * | 2/2007 | Yoshida et al. | 375/219 |
| 7,203,488 | B2 * | 4/2007 | Luneau | 455/422.1 |
| 7,305,259 | B1 * | 12/2007 | Malone et al. | 455/574 |
| 7,369,815 | B2 * | 5/2008 | Kang et al. | 455/73 |
| 7,404,074 | B2 * | 7/2008 | Murotake | 713/100 |
| 7,512,423 | B2 * | 3/2009 | Karaoguz | 455/574 |
| 2002/0067709 | A1 | 6/2002 | Yamada et al. | 370/337 |
| 2002/0119803 | A1 * | 8/2002 | Bitterlich et al. | 455/552 |
| 2003/0115369 | A1 | 6/2003 | Walter et al. | 709/253 |
| 2003/0165155 | A1 | 9/2003 | Johnson et al. | 370/442 |
| 2004/0057407 | A1 | 3/2004 | Balachandran et al. | 370/336 |
| 2004/0125784 | A1 | 7/2004 | Lee et al. | 370/345 |
| 2004/0152478 | A1 | 8/2004 | Ruohonen et al. | 455/502 |
| 2008/0267270 | A1 * | 10/2008 | Darabi | 375/219 |

OTHER PUBLICATIONS

"The Software Defined Radio (SDR) in Network Centric Operations (NCO)" by Alan C. Trimble, Ph.D. being presented at the IEEE, Oct. 2005.

U.S. Appl. No. 10/198,361 entitled "Ruggedized Electronics Sub-System Module" and having inventor Steve I. Lebo; Jul. 2002.

U.S. Appl. No. 10/197,737 entitled "Ruggedized Electronics Module Cooling System" and having inventors Steve I. Lebo and Scott J. Sellner; Jul. 2002.

U.S. Appl. No. 10/229,941 entitled "Modular Communication Platform" and having inventor Richard D. Spring, Timothy E. Snodgrass, Robert R. Jakoubek and Steve I. Lebo; Aug. 2005.

U.S. Appl. No. 11/199,451 entitled "System and Method For Net Formation and Merging in Ad Hoc Networks" and having inventor Timothey E. Snodgrass, which is filed on the same day herewith: Aug. 2005.

U.S. Appl. No. 11/199,440 entitled "Improved Net Formation-Merging System and Method" and having inventor Timothey E. Snodgrass and James A. Stevens, which is filed on the same day herewith: Aug. 2005.

U.S. Appl. No. 11/199,426 entitled "System and Method For Thermal Load Sharing Between Nodes in a Communications Network" and having inventor Timothey E. Snodgrass, which is filed on the same day herewith, Aug. 2005.

* cited by examiner

LOW POWER, PROGRAMMABLE MODEM FOR SOFTWARE DEFINED RADIO APPLICATIONS

FIELD OF THE INVENTION

The present invention relates generally to communications, to signal processing, and to integrated circuits. More specifically, the invention relates to an integrated circuit architecture for implementing a low power, programmable modem for use in software defined radio applications.

BACKGROUND

In general, a modem is a device that both modulates and demodulates signals communicated across a wired or a wireless network, and thus, provides an interface for the communication of data over the network. A variety of different waveforms may be transmitted wirelessly using a number of different digital codes, signal processing methods, frequencies, etc. to achieve communication through noisy and error prone channels. Traditionally, the military has used dedicated radio systems that have a radio for each specific application such as VHF, UHF, and HF. More recently, the military has been pursuing software defined radios that include hardware that can be reprogrammed to process different waveforms.

In the past, very low power, efficient modems were fabricated of dedicated, and thus, non-programmable, hardware in combination with a very low power digital signal processor (DSP). Such hardware implementations are cost-effective and low power, but do not meet the current reprogrammable requirements. Currently, reprogrammable modems are implemented using either a very large field programmable gate array (FPGA) or a custom application specific integrated circuit (ASIC). FPGAs avoid the high initial engineering design costs of ASICs, but lack in performance and in efficiency. In general, modems implemented using FPGAs require in the range of 14-19 watts of power when implementing a modern communications waveform such as orthogonal frequency division multiplexing or turbo coding. This power utilization by the FPGA and the corresponding heat dissipation requirement is unacceptable in battery powered applications and in passively cooled environments. What is needed, therefore, is a programmable modem having much lower power utilization, for example, on the order of 2-3 watts. What is further needed is a programmable modem that can be reconfigured to support different communication technologies and resulting waveforms.

SUMMARY

A particular example of the invention provides a device that achieves the efficiency of dedicated hardware without compromising the ability to be reprogrammed and reconfigured. An exemplary embodiment of the invention relates to a modem that is reconfigurable to support communication using different communication technologies. The modem includes, but is not limited to, a plurality of communication processing modules and a switching interface. The switching interface couples to the plurality of communication processing modules. An instruction set is written into the modem to select one or more communication processing modules of the plurality of communication processing modules to connect using the switching interface. One or more of the communication processing modules may be programmable. The instruction set may include programmable parameters and/or programming instructions for the one or more programmable communication processing modules. As a result, the modem is reprogrammable and reconfigurable to process different communication signals while utilizing less power than conventional designs.

Other exemplary embodiments of the invention include a communication node utilizing the modem, one or more computer-readable media having computer-readable instructions stored thereon that, upon execution by a processor, cause the processor to define a modem configuration to support processing of a communication signal or to implement a modem configuration, and a method of implementing a modem reconfigurable to support communication using different communication technologies.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

DETAILED DESCRIPTION

Figure 1:
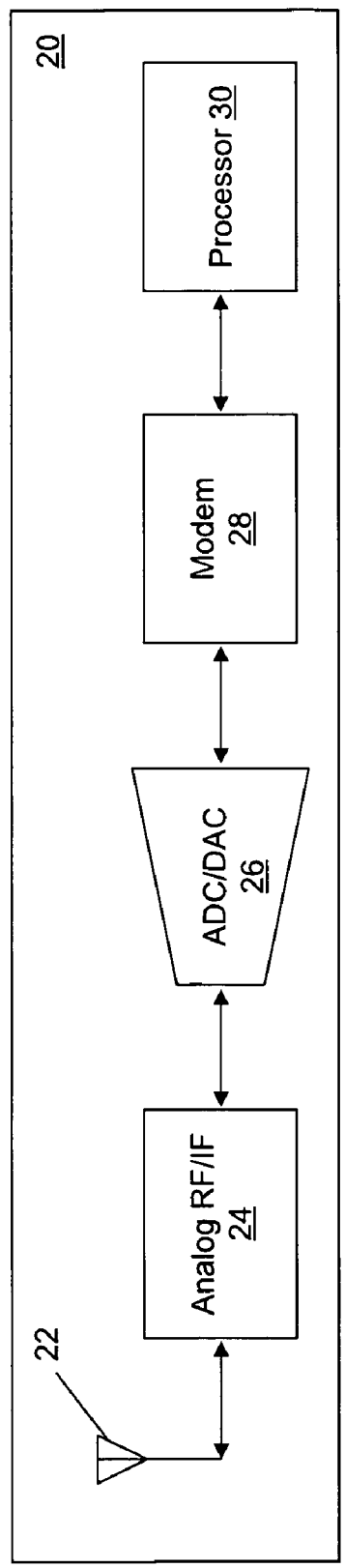
FIG. 1 is a block diagram of a communication node in accordance with an exemplary embodiment.

With reference to FIG. 1, a communication node 20 in accordance with an exemplary embodiment is shown. Communication node 20 includes, but is not limited to, a transceiver antenna 22, an analog RF/IF filter 24, an analog-to-digital converter/digital-to-analog converter (ADC/DAC) 26, a modem 28, and a processor 30. Communication node 20 may provide communication capabilities across the entire communication spectrum or across only a portion of the spectrum. In operation, a signal is received by transceiver antenna 22, filtered from a transmission radio frequency (RF) to an intermediate frequency (IF) by the analog RF/IF filter 24, converted from an analog signal to a digital signal by ADC/DAC 26, and demodulated by modem 28 thereby forming data for input to processor 30. Similarly, in a reverse procedure, a signal from the processor 30 is modulated by the modem 28, converted from a digital signal to an analog signal by the ADC/DAC 26, filtered from IF to RF by the analog RF/IF filter 24, and transmitted by the transceiver antenna 22. In an alternative embodiment, the signal transmitted/received is digital and no ADC/DAC 26 is included. In another alternative embodiment, the communication node 20 may include separate transmit and receive channels. Additional components may be utilized by the communication node 20. For example, the communication node 20 includes one or more power source that may be a battery.

Figure 2:
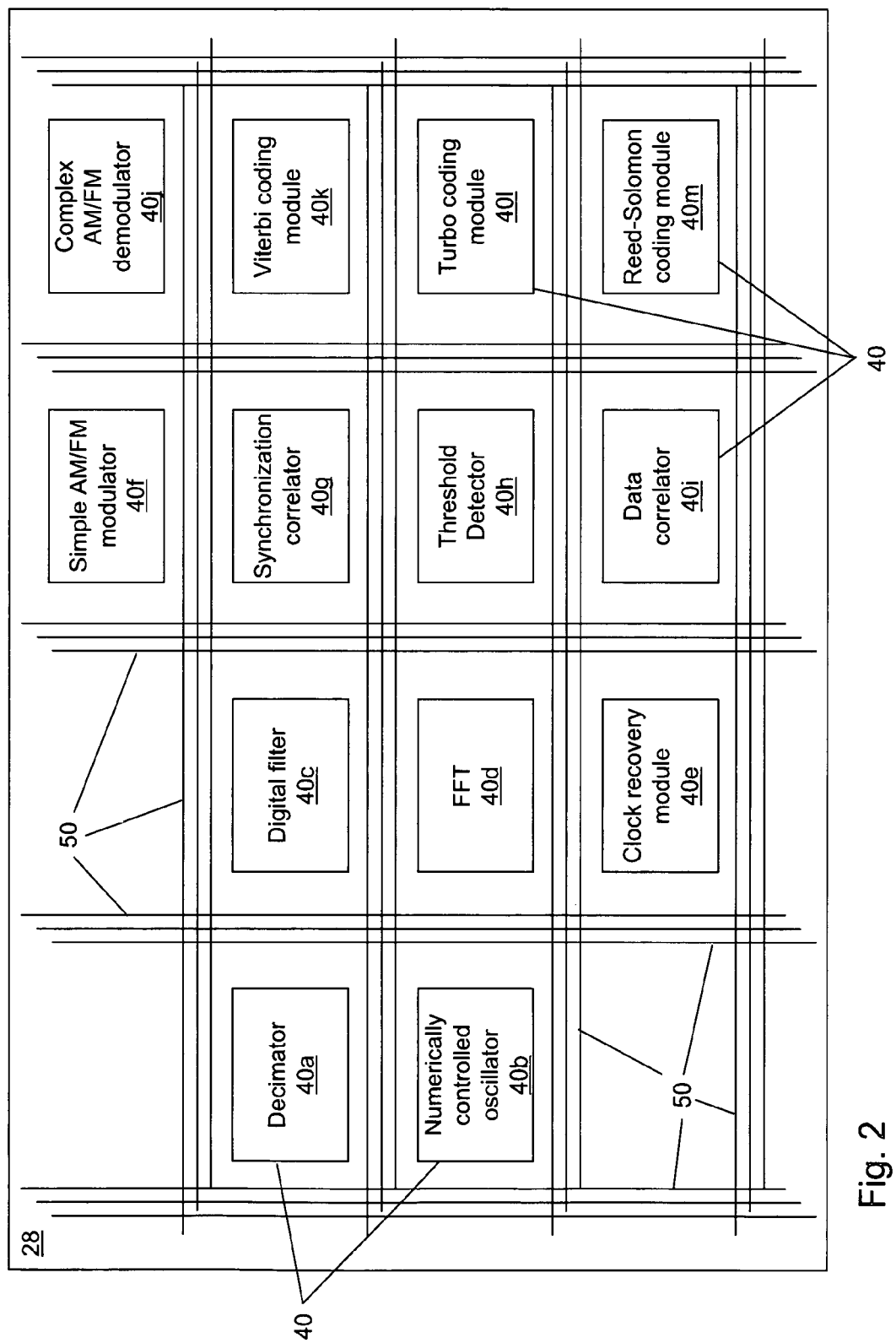
FIG. 2 is a block diagram of a modem in accordance with an exemplary embodiment.

With reference to the exemplary embodiment of FIG. 2, the modem 28 includes a plurality of communication processing modules 40 and a switching interface 50. The communication processing modules 40 are power efficient integrated circuits that implement a signal processing function utilized in the processing of a communication signal. Some or all of the communication processing modules 40 may be implemented with configuration switches designed into them. As a result, the communication processing modules 40 can be adapted through reprogramming to perform variations within their function type. In general, some or all of the communication processing modules 40 are implemented as digital ASICs arranged in an array. Preferably, the digital ASICs are implemented using highly power optimized custom ASIC technologies. Using power optimized custom ASIC technologies instead of FPGA technologies results in less power consumption. For improved performance, particularly relative to power consumption, the plurality of communication processing modules 40 may be implemented on the same die. Additionally, all of the communication processing modules 40 are not used simultaneously in each possible modem configuration. As a result, each communication processing module preferably includes a power down feature to deactivate those modules not used in a specific modem configuration. As a result, the modem 28 preferably can be designed to use in the range of 2-3 watts of power, though, the design in not limited by this range.

Example communication processing modules 40 include a decimator 40*a*, a numerically controlled oscillator 40*b*, a digital filter 40*c*, a fast Fourier transform (FFT) 40*d*, a clock recovery module 40*e*, a simple AM/FM modulator 40*f*, a synchronization correlator 40*g*, a threshold detector 40*h*, a data correlator 40*i*, a complex AM/FM demodulator 40*j*, a Viterbi coding module 40*k*, a turbo coding module 40*l*, and a Reed-Solomon coding module 40*m*. More than one of any or of all of the communication processing modules 40*a*-40*m* may be included in the modem 28. The array of communication processing modules 40 may be arranged in an optimum way to minimize the communication distance between elements that are commonly connected through the switching interface 50. Additionally, communication processing modules 40 that perform the same or similar functions may be organized together. Other signal processing functions not specifically mentioned herein and/or not yet invented may be used without departing from the scope of the invention.

The switching interface 50 provides connectivity between the communication processing modules 40. The switching interface 50, for example, may be implemented as a switching fabric that is a collection of switching elements or switches and links. Each switching element contains a minimum of three input/output ports in any combination with at least one input port and one output port. Each switching element also has the ability to dynamically establish arbitrary connections between inputs and outputs under the control of a routing mechanism. The pattern of connections formed by links and switches defines the topology of the fabric. The switching fabric may contain many different switches and redundant paths throughout the fabric, such that a plurality of signals can be traveling through the switching fabric at any given time. The switched fabric configuration may contain a plurality of channel adapters such that the various communication processing modules 40 can continue operating while their signals are traveling through the switching fabric.

Practical implementations using switching fabrics favor modularity. Thus, the switching elements may have equal numbers of inputs and outputs so that the fabrics exhibit regular geometric (mathematically definable) topologies and multiple fabrics in an interconnect can be identical. Thus, relative to improved performance, the switching elements may have a cross bar construction in which all outputs can be simultaneously connected to different inputs providing a homogeneous communication architecture. A high speed time division multiple access fabric that is multi-level security capable and redundant with fault tolerance is used in an exemplary embodiment. Other switching interface technologies not specifically mentioned herein and/or not yet invented may be used without departing from the scope of the invention.

The communication processing modules 40 may be high level logical and arithmetic primitives that are arranged and interconnected to form complex signal processing algorithms. The specific arrangement and interconnection of the communication processing modules 40 defines a modem configuration for processing a communication signal of the communication node 20. Some or all of the communication processing modules 40 may be programmable by allowing selection of programming parameters that define operating characteristics of the module. Additionally, some or all of the communication processing modules 40 may be programmable by allowing definition of programming instructions that define more complex operating characteristics of the module. As examples, the digital filter 40*c* may be programmed with a number of taps, feedback coefficients, a cutoff frequency, a clock rate, etc. The numerically controlled oscillator 40*b* may be programmed with a clock rate, an accumulation feedback quantity, an output phase, a resolution, etc. The numerically controlled oscillator 40*b* may be programmed with a clock rate, an accumulation feedback quantity, an output phase, a resolution, etc. The Viterbi coding module 40*k* may be programmed with a polynomial, a constraint length, a history length, etc. The decimator 40*a* may be programmed with a sample rate, a decimation quantity, a digital quantization length, etc. The FFT 40*d* may be programmed with a number of points, a conversion rate, a digital quantization factor, etc. The clock recovery module 40*e* may be programmed with a modulation type, a symbol rate, soft decision parameters, etc. The data correlator 40*i* may be programmed with a correlation pattern, a correlation data mask, a sample rate, etc. The threshold detector 40*h* may be programmed with a threshold level, a bit weighting, a soft decision criteria, etc. The turbo coding module 40*l* may be programmed with both polynomials, interleaver dimensions, etc. The Reed-Solomon coding module 40*m* may be programmed with a Galois field, a BCH block size, etc.

Some or all of the communication processing modules 40 may include a memory for storing data including any programming parameters and instructions. The memory is designed to be embedded in the components to receive modem-specific and module-specific data. The memory preferably is resident and may include blocks for module designation data, programming parameters, programming instructions, input and output port usage, etc. The memory may also include dedicated blocks for output data. The memory may be initially programmed and subsequently reprogrammed as the modem configuration is modified or designations change.

The communication processing modules 40*a*-40*m* are not intended to include an exhaustive list of all of the possible signal processing functions that may be implemented in the modem 28. For example, the Viterbi coding module 40*k*, the turbo coding module 40*l*, and the Reed-Solomon coding module 40*m* are all channel coding modules often used in digital communication systems to protect the digital information from noise and interference and to reduce the number of bit errors. Additional coding modules that may be implemented in the modem 20 include a Hamming coding module, a Golay coding module, a BCH coding module, a trellis coded modulation coding module, a low density parity check, etc. Similarly, other modulators and demodulators may be included in the modem 20 including amplitude shift keying, frequency shift keying, and phase shift keying modulators and demodulators. One or more digital signal processor also may be included as communication processing modules 40. Inclusion of a digital signal processor in the modem 28 further reduces the power requirements of the modem 28 because one set of digital bus drivers is eliminated. Thus, the communication processing modules 40a-40m are included for purposes of example and not limitation.

Figure 3:
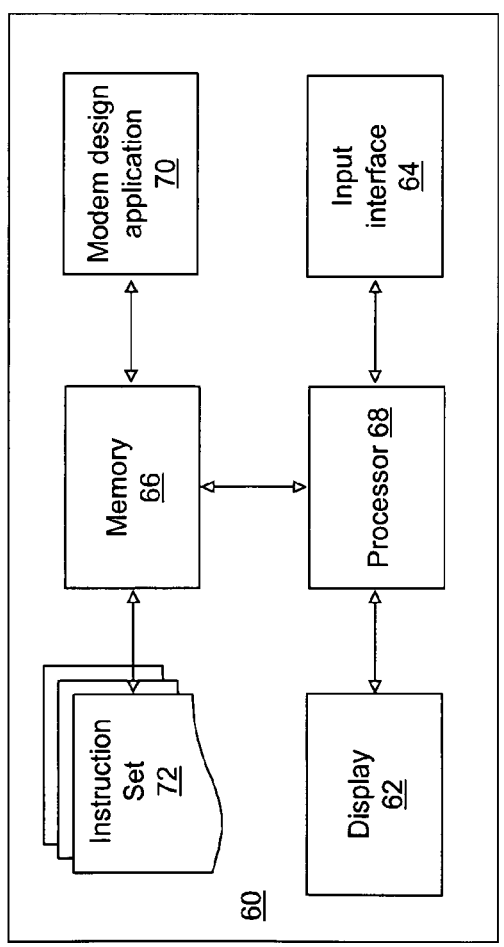
FIG. 3 is device for defining a modem configuration in accordance with an exemplary embodiment.

Referring to FIG. 3, a device 60 for defining a modem configuration for the modem 28 is shown in accordance with an exemplary embodiment. The term "device" should be understood to include, without limitation, personal digital assistants, computers of all form factors, etc. The communication node 20 may be incorporated into the device 60 or may be separate from the device 60. The device 60 includes a display 62, an input interface 64, a memory 66, a processor 68, a modem design application 70, and an instruction set 72.

The display 62 presents information to the user of the device 60 including, but not limited to, information from the modem design application 70. The display may be a thin film transistor display, a light emitting diode display, a liquid crystal display, a cathode ray tube display, etc.

The input interface 64 provides an interface for receiving information from the user for entry into the device 60. The input interface 64 may use various input technologies including, but not limited to, a keyboard, a pen and touch screen, a mouse, a track ball, a touch screen, a keypad, one or more buttons, etc. to allow the user to enter information into the device 60 or to make selections from the device 60.

The memory 66 provides an electronic holding place for an operating system of the device 60, the modem design application 70, the one or more instruction set 72, and/or other applications. The device 60 may have one or more memory 66 that use the same or different memory technologies as known to those skilled in the art or to be developed including random access memory, read only memory, flash memory, etc.

The processor 68 executes instructions that cause the device 60 to perform various functions. The instructions may be written using one or more programming language, scripting language, assembly language; etc. Additionally, the instructions may be carried out by a special purpose computer, logic circuits, or hardware circuits. Thus, the processor 68 may be implemented in hardware, firmware, software, or any combination of these methods. The processor 68 executes an application meaning that it performs the operations called for by that application in the form of a series of instructions. The processor 68 retrieves an application from the memory 66. The processor 68 executes the instructions embodied in the modem design application 70. The processor 68 may be the same as the processor 30. The device 60 may have one or more processor 68.

Using the modem design application 70, a user may define a modem configuration for processing a communication signal at the communication node 20. The communication signal may be any waveform for use in transmitting and/or in receiving information from a device. The modem design application 70 may be implemented as an organized set of instructions that, when executed, allow the user to select and to arrange communication processing modules 40. The instructions may be written using one or more programming language, assembly language, scripting language, etc. The modem design application 70 may be implemented to allow the user to select and to arrange communication processing modules 40 on a palette graphically and to define programmable parameters for each selected communication processing module. In doing so, the user also defines one or more transmission path from the switching interface 50 that interconnects the selected communication processing modules appropriately. Alternatively, the user may specify the desired connectivity, and the one or more transmission path may be selected automatically based on the desired connectivity using algorithms of the modem design application 70. The transmission path may be implemented dynamically in a specific modem configuration allowing it to be redefined by a higher level software application that controls use of the modem 28 in multiple ways, for example, within a time division multiplex structure.

The output of the modem design application 70 is the instruction set 72 that defines the modem configuration through the selected communication processing modules, the selected transmission path of the switching interface 50, and/or the selected programming parameters and/or instructions of the selected communication processing modules. One or more instruction set 72 may be stored in the memory 66. Alternatively, the instruction set may be stored in another device in communication with device 60 including the communication node 20. In another alternative, the instruction set may be stored in a removable memory media. The one or more instruction set 72 may be stored in a database as known to those skilled in the art. The instruction set 72 may be a file or a data set that includes a sequence of data items and/or instructions for configuring the modem 28. The instruction set 72 may be stored in the form of a binary file or a text file. The text file, for example, may include text based on a scripting language, an assembly language, a markup language, etc. or some combination of these in addition to data parameters all saved in a variety of formats as known to those skilled in the art.

Figure 4:
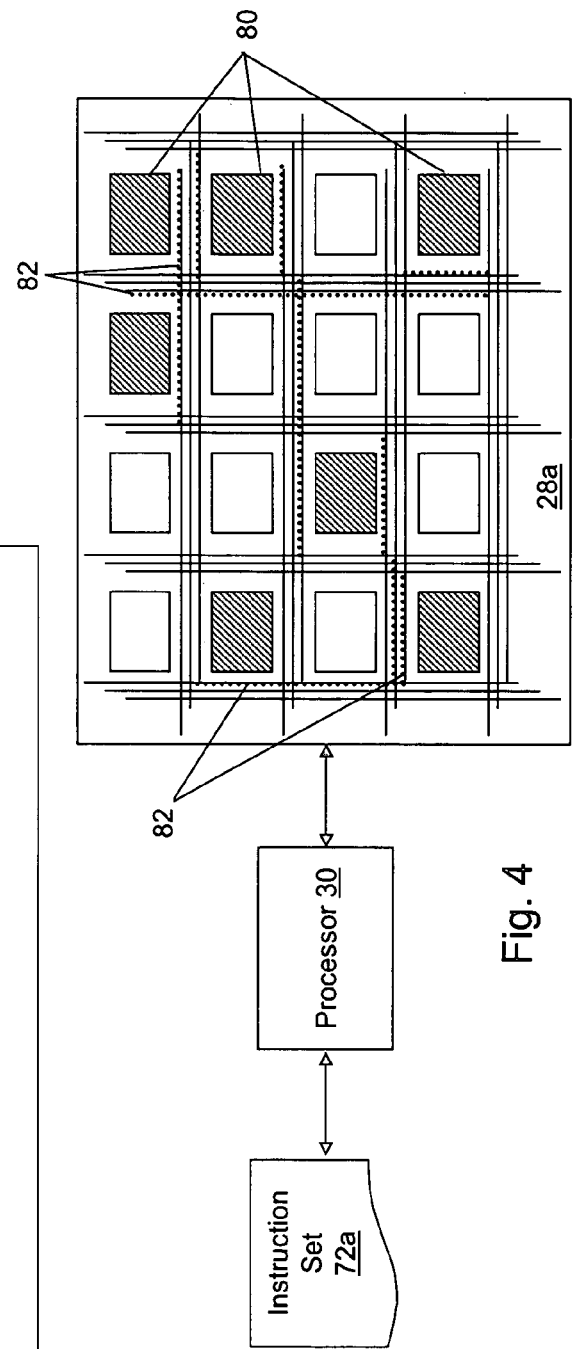
FIG. 4 is a block diagram of a process for implementing the modem configuration of FIG. 3 in accordance with an exemplary embodiment.

With reference to FIG. 4, a block diagram of a process for implementing the modem configuration defined using the modem design application 70 is shown in an exemplary embodiment. The process is executed under program control in software running on the processor 30 of the communication node 20. The processor 30 may be the processor 68 of the device 60 if communication node 20 is implemented as part of the device 60. In an alternative embodiment, the processor 30 is in communication with the modem 28 through a wired or a wireless connection. An instruction set 72a is selected from one or more instruction set 72 accessible by the communication node 20, for example, through a memory media or a network connection. The processor 30 writes the selected instruction set 72a into the modem 28 to define a modem configuration 28a. The modem configuration 28a includes selected communication processing modules 80 (shown with cross hatching) and a selected transmission path 82 (shown in dashed lines) that define the modem configuration 28a. The write process is similar to other "write a memory" type initialization processes. The modem design application 70 determines what information, including data values, instructions, and switch positions, is needed to implement the modem 28a using memories and data registers of the communication processing modules 40 based on user selections and definitions and on knowledge of the modem die structure. The modem design application 70 stores the information into the instruction set 72 that is "written" into the modem die much like information is written into a block of memory as known to those skilled in the art.

Reconfiguration of the modem 28 is accomplished by writing a new instruction set into the modem 28. The new instruction set may be different in the selected communication processing modules, the selected transmission path, and/or in the selected programming parameters/instructions. Writing the new instruction set allows the communication node 20 to process different waveforms.

The foregoing description of exemplary embodiments of the invention have been presented for purposes of illustration and of description. For example, the modem can be used in either wired or wireless communication systems. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A modem device reconfigurable to support communication using different communication technologies, the modem device comprising:
    a plurality of communication processing modules; and
    a switching interface comprising a switching fabric, the switching interface coupling the plurality of communication processing modules;
    wherein an instruction set written into the modem device via a modem design application is configured to select one or more communication processing modules of the plurality of communication processing modules to connect using the switching interface thereby defining a modem configuration to process a communication signal, wherein the defined modem configuration uses less than three watts of power, wherein one or more of a selected communication processing modules are not powered down based on being selected by the instruction set, wherein the plurality of communication processing modules are powered down when not selected by the instruction set.

2. A modem device reconfigurable to support communication using different communication technologies, the modem device comprising:
    a plurality of communication processing modules; and
    a switching interface comprising a switching fabric, the switching interface coupling the plurality of communication processing modules;
    wherein an instruction set written into the modem device is configured to select one or more communication processing modules of the plurality of communication processing modules to connect using the switching interface thereby defining a modem configuration to process a communication signal, wherein one or more of a selected communication processing modules are not powered down based on being selected by the instruction set, wherein the plurality of communication processing modules are powered down when not selected in the instruction set.

3. The device of claim 1, wherein each of the plurality of communication processing modules is an integrated circuit configured to implement a signal processing function for processing the communication signal.

4. The device of claim 3, wherein the signal processing function is selected from the group consisting of a decimation function, an oscillation function, a filtering function, a fast Fourier transformation function, a clock recovery function, a modulation function, a demodulation function, a correlation function, a threshold detection function, an interpolation function, an error detection function, an error correction function, a digital signal processing function, an arithmetic accelerator function, an encryption function, a compression function, and a shift keying function.

5. The device of claim 1, wherein one or more of the plurality of communication processing modules is programmable.

6. The device of claim 5, wherein the instruction set further includes a programming parameter for the one or more programmable communication processing modules.

7. The device of claim 5, wherein the instruction set further includes a programming instruction for the one or more programmable communication processing modules.

8. The device of claim 1, wherein the plurality of communication processing modules are fabricated on the same die.

9. The device of claim 1, wherein one or more of the plurality of communication processing modules include a memory.

10. The device of claim 2, wherein the defined modem configuration uses less than three watts of power.

11. The device of claim 1, wherein a second instruction set is stored in a memory accessible by the device, and further wherein, the modem is reconfigured to process a different communication signal by writing the second instruction set into the device.

12. A modem device reconfigurable to support communication using different communication technologies, the modem device comprising:
    a plurality of communication processing modules; and
    a switching interface comprising a switching fabric, the switching interface coupling the plurality of communication processing modules;
    wherein an instruction set written into the modem device is configured to select one or more communication processing modules of the plurality of communication processing modules to connect using the switching interface thereby defining a modem configuration to process a communication signal, wherein the instruction set further selects a transmission path defined from the switching interface to interconnect the selected one or more communication processing modules, wherein one or more of a selected communication processing modules are powered based on being selected by the instruction set, wherein the plurality of communication processing modules are not powered when not selected by the instruction set.

13. The device of claim 1, wherein the instruction set is in the form of a text file.

14. The device of claim 1, wherein the instruction set is in the form of a binary file.

15. A communication node, the node comprising:
    a receiver, the receiver configured to receive a communication signal; and
    a modem, the modem configured to process the received communication signal, the modem being reconfigurable to support communication using different communication technologies and comprising:
    a plurality of communication processing modules; and
    a switching interface comprising a switching fabric, the switching interface coupling the plurality of communication processing modules;
    wherein an instruction set written into the modem is configured to select one or more communication processing modules of the plurality of communication processing modules to connect using the switching interface thereby defining the modem configuration to process the received communication signal, wherein the defined modem configuration uses less than three watts of power, wherein one or more of a selected communication processing modules are not powered down based on being selected by the instruction set, wherein the plurality of communication processing modules are powered down when not selected by the instruction set.

16. The node of claim 15, further comprising a transmitter, the transmitter configured to transmit a second communication signal.

17. The node of claim 15, wherein the modem is reconfigured to process a second communication signal using a second instruction set.

18. A non-transitory computer-readable medium for a modem device being reconfigurable to support communication using different communication technologies, the computer-readable medium having computer-readable instructions stored thereon the instructions comprising:
  causing the modem to receive a selection of one or more communication processing modules from a plurality of communication processing modules, the one or more communication processing module selected to implement a modem configuration upon execution by a processor;
  causing the modem to define a transmission path in a switching interface including a switching fabric to connect the selected one or more communication processing modules upon execution by the processor; and
  causing the modem to create an instruction set including the selected one or more communication processing modules and the defined transmission path upon execution by the processor;
  causing the modem to wherein writing the created instruction set into the modem device defines the modem configuration to process a communication signal, wherein the instruction set causes the processor to further select a transmission path defined from the switching interface to interconnect the selected one or more communication processing modules, wherein one or more of a selected communication processing modules are powered based on being selected by the instruction set, wherein the plurality of communication processing modules are not powered when not selected by the instruction set.

19. The non-transitory computer-readable medium of claim 18, further comprising allowing a user to select the one or more communication processor modules.

20. The non-transitory computer-readable medium of claim 18, further comprising allowing a user to select the transmission path.

21. The non-transitory computer-readable medium of claim 18, further comprising allowing a user to define a programmable parameter of the selected one or more communication processing modules.

22. The non-transitory computer-readable medium of claim 18, further comprising allowing a user to define a programmable instruction of the selected one or more communication processing modules.

* * * * *